United States Patent [19]

Herman

[11] 3,996,495
[45] Dec. 7, 1976

[54] HIGH EFFICIENCY BALLAST SYSTEM FOR ELECTRIC DISCHARGE LAMPS

[75] Inventor: Stephen Herman, Monsey, N.Y.
[73] Assignee: North American Philips Corporation, New York, N.Y.
[22] Filed: July 25, 1975
[21] Appl. No.: 598,921
[52] U.S. Cl. .......................... 315/244; 315/227 R; 315/247; 315/276; 315/DIG. 5
[51] Int. Cl.² ........................................ H05B 41/23
[58] Field of Search ............... 315/227 R, 244, 246, 315/247, 276, DIG. 5

[56] References Cited
UNITED STATES PATENTS

| | | | |
|---|---|---|---|
| 2,593,651 | 4/1952 | Bird | 315/227 R |
| 3,309,568 | 3/1967 | Nilssen | 315/244 X |
| 3,911,320 | 10/1975 | Crawford et al. | 315/227 R X |

Primary Examiner—Eugene La Roche
Attorney, Agent, or Firm—Frank R. Trifari; Bernard Franzblau

[57] ABSTRACT

An improved ballast circuit for one or more electric discharge lamps includes a nonlinear variable capacitor connected in series with an iron core inductor and the lamps across the terminals of a source of alternating current. The nonlinear capacitor preferably exhibits a voltage and/or current dependent capacitance characteristic. The use of the nonlinear capacitor improves the crest factor of the lamp current waveform thereby increasing the operating efficiency of the ballast circuit and reducing the size and cost of the iron core inductor.

11 Claims, 9 Drawing Figures

HIGH EFFICIENCY BALLAST SYSTEM FOR ELECTRIC DISCHARGE LAMPS

BACKGROUND OF THE INVENTION

This invention relates to circuits for starting and operating gaseous discharge devices, both low and high pressure, such as, for example, fluorescent lamps and high pressure mercury vapor lamps. More particularly, it relates to an improved ballast apparatus especially adapted to provide improved operation of such gaseous discharge devices.

It is well known that the operation of a load which has a negative resistance characteristic, such as a gas discharge lamp, usually requires a series of connected stabilizing impedance or ballast. The principal functions of the ballast are to provide the requisite operating and starting voltages for the electric discharge lamp and to regulate or limit the lamp operating current. Both passive and active types of ballast have been used to start and operate electric discharge devices such as fluorescent lamps or mercury vapor lamps. In the passive type of ballast a reactive impedance element is usually employed to provide the current regulating action necessitated because of the negative resistance characteristic of the electric discharge device. The reactive elements used for operating electric discharge devices with an alternating current source may be a simple inductor, or a high-leakage-reactance transformer in the case where a step-up voltage is necessary to reliably start or operate the gas discharge device. Capacitors are also used at times in conjunction with inductive elements to provide the current limiting ballast function for a discharge device. The types of inductive ballasts in common use are cumbersome and expensive because they generally require comparately large iron cores and heavy windings in order to operate on the customary 60 Hertz AC power line. Similarly, the capacitors used are generally of the oil-filled type which use PCB type insulating oil as the dielectric fluid and are therefore a potential health hazard due to the toxic nature of the PCB oil.

In order to limit the size and expense of ballasts, a great variety of starting devices have been proposed, some of which are relatively complicated and actually add to the total cost of the system even while reducing the size and expense of the ballast element itself. One prior art solution entirely eliminates the ballast by operating the discharge lamp at a relatively high frequency, i.e. high relative to the 60 Hz AC supply voltage, but this solution has its own problems, for example, high frequency interference signals are generated which interfere with other electronic apparatus in the vicinity. There are also problems of reliability and power factor in making the conversion to high frequency.

Another solution, advanced in U.S. Pat. No. 3,383,554, adds a saturable reactor in series with the gas discharge tube to provide a current responsive variable impedance which maintains the tube discharge and provides a dimming function. It has been further proposed, in U.S. Pat. No. 3,496,412, to electrically interpose a rectangular wave generator between the source of AC power and the ballast circuit for the discharge lamp, thereby to prevent deionization of the gas when the supply voltage reverses polarity.

In general, it is an object of the invention to provide an improved ballast circuit for starting and operating a negative resistance device such as an electric discharge lamp.

Another object of the invention is to improve the operating characteristics of a conventional inductive-capacitive type ballast apparatus.

A further object of the invention is to increase the efficiency of a ballast system used with gas discharge lamps.

In the case where a transformer or inductor ballast is used, it is known to connect a fixed value capacitor in series therewith. The purpose of this capacitor is to provide a leading lamp current and to regulate or control the lamp current despite variations in the supply voltage. A further purpose of the capacitor is to provide power factor correction through saturation control of the magnetic circuit.

One figure of merit of a ballast circuit is the "crest factor" of the lamp current waveform, which is defined as the ratio of the peak lamp current to the rms value of lamp current. A typical ballast operating crest factor is 1.60. It is generally agreed that the crest factor should be kept below 1.7 in order to avoid undue shortening of the lamp life. A true sinusoid lamp current would have a crest factor of 1.41, whereas a perfect squarewave would be 1.0, the optimum value to produce maximum lamp efficiency. In general, the lamp current waveforms obtained with most ballast devices exhibit a distorted sinusoidal waveshape which reduces the lamp efficiency as well as its useful life.

It is therefore a further object of the invention to provide an improved ballast circuit with a crest factor that more nearly approaches the ideal square wave characteristic.

Another object of the invention is to provide a novel apparatus for improving the efficiency of an inductive type ballast by reducing the crest factor of the discharge lamp current waveform.

It is a further object of the invention to provide an improved apparatus for compensating for the distortion of the lamp current waveform caused by saturation of the iron core of a ballast coil or transformer.

SUMMARY OF THE INVENTION

A ballast device in accordance with this invention utilizes a nonlinear variable capacitor connected in series with a conventional high reactance transformer or auto transformer ballast and an electric discharge device across the terminals of a source of AC voltage. In one preferred embodiment the capacitance of the nonlinear capacitor is voltage-dependent and exhibits a decreasing capacitance vs. voltage characteristic, i.e. the capacitance decreases as the voltage increases.

I have discovered that the use of a nonlinear variable capacitor in place of a conventional fixed value capacitor can provide a significant improvement in the lamp current crest factor and hence a more efficient operation of the discharge lamp. In addition, a nonlinear variable capacitor compensates for the current waveshape distortion evident in most gas discharge lamps, and especially when the distortion is caused by saturation of the iron core of a ballast coil or transformer. The nonlinear capacitor in series with the lamp converts a peaked current into a more nearly square wave current. Although the exact nature of the mechanism by which the nonlinear capacitor accomplishes the foregoing function is not perfectly understood, it appears that the value of the series capacitance should be large when the uncorrected current peaks occur and should decrease as the current falls. Thus, as the capacitance increases, the capacitor can store more electric charge, reducing the peak current. When the current subsequently tries to fall, the capacitance decreases, thus returning its stored charge to the circuit and thereby increasing the current to the lamp. The result is a "squared" current waveform.

In selecting a suitable voltage-dependent capacitor for use in this invention, I have found that capacitors which utilize a dielectric material which consists entirely or partly of a ferroelectric material produce good results. It is also feasible to select a capacitor having a dielectric that exhibits no ferroelectric properties, or antiferroelectric properties for low values of applied voltage and which undergoes a transition to ferroelectric behavior as the applied voltage increases. It is also advantageous to combine both the aforesaid types of capacitors in various series and parallel combinations, sometimes in combination with linear capacitors, in order to tailor the nonlinear variable capacitance characteristic to a particular ballast and discharge lamp combination. It is also conceivable to synthesize a particular capacitance characteristic by selecting suitable combinations of nonlinear and linear dielectric material to form a single nonlinear capacitor. In particular, it is beneficial to select a capacitor having a low hysteresis dielectric, i.e. a thin-loop material, because this type of material exhibits relatively low power losses. Dielectric materials suitable for use in such a capacitor include so-called PLZT materials, a mixture composed of lead zirconate, lead titanate and lanthanum oxide. Other suitable dielectric materials are composed of Barium Titanate compositions.

In sample tests using nonlinear voltage-dependent ferroelectric capacitors, I was able to improve the discharge lamp current crest factor by 11 to 23 percent. In one test I was able to achieve a lamp current crest factor of 1.35, a substantial improvement over known ballast devices. One result thereof is that it is possible to reduce the lamp current by as much as 16 percent with no loss of light output.

For the sake of completeness, it should be noted that it is known from U.S.Pat. No. 3,309,568 to use a saturable capacitor connected across the contacts of a switching element of an automobile ignition system in order to reduce arcing in the contact electrodes. However, the function and operation of the aforesaid saturable capacitor is unrelated to that disclosed by applicant in the present invention.

BRIEF DESCRIPTION OF THE DRAWINGS

Other features, advantages and objects of the invention will become apparent from consideration of the following description of of a preferred embodiment when considered in conjunction with the attached drawings in which.

DESCRIPTION OF THE PREFERRED EMBODIMENT

Figure 1:
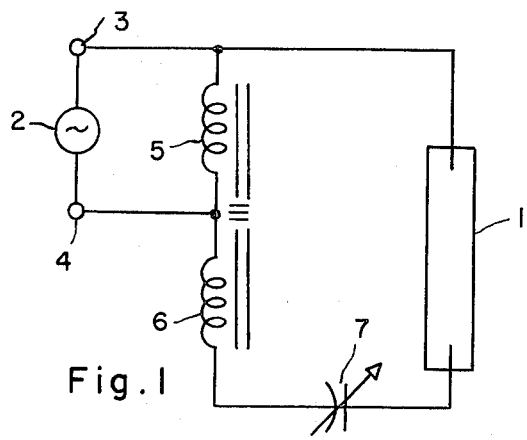
FIG. 1 is a circuit diagram of an exemplary embodiment of the invention.

Referring first to FIG. 1 of the drawing, there is shown a system according to the present invention for starting and operating a negative resistance load such as a gas discharge lamp 1. A source of AC voltage 2 is connected to input terminals 3, 4 in order to provide energizing potentials for the system. The AC power supply can be the usual 60 Hz, 110 volt line supply in common use at the present time. Input terminals 3,4 are connected to the primary winding 5 of an iron core high leakage reactance autotransformer. The autotransformer has a secondary winding 6. The top terminal of secondary winding 6 is directly connected to the bottom terminal of primary winding 5. The bottom terminal of winding 6 is connected to one electrode of a nonlinear variable capacitor 7. The nonlinear capacitor 7 may be of the ferroelectric type or the combination antiferroelectric-ferroelectric type mentioned above and, in accordance with the invention, will improve the lamp current crest factor and will compensate for current waveform distortion caused by saturation of the autotransformer iron core. Alternatively, capacitor 7 may comprise two or more nonlinear capacitors connected in parallel, in series, or in series-parallel configurations, with or without linear capacitors, in order to derive a particular variable capacitance characteristic especially fashioned to match the particular characteristics of a ballast and/or discharge lamp. The desired nonlinear capacitance characteristic also may be synthesized by a particular selection and combination of dielectric materials. The nonlinear capacitor is preferably a voltage dependent capacitor having a ferroelectric dielectric composed of a PLZT material. One suitable PLZT material is a PLZT 9/65/35, a composition containing 9% lanthanum and a 65/35 ratio of lead zirconate and lead titanate currently marketed by Motorola Corp. as type 9065 PLZT. The other electrode of the nonlinear capacitor is connected to one terminal of the discharge lamp 1, for example, a fluorescent tube. The other terminal of the fluorescent lamp is connected to the top terminal of the primary winding 5 of the autotransformer.

Figure 2A:
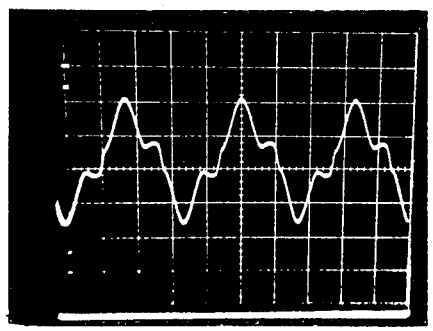
FIG. 2A graphically illustrates the lamp current waveform in a typical prior art ballast circuit, FIG. 2B graphically illustrates the lamp current waveform obtained with one preferred embodiment of the invention.
Figure 2B:
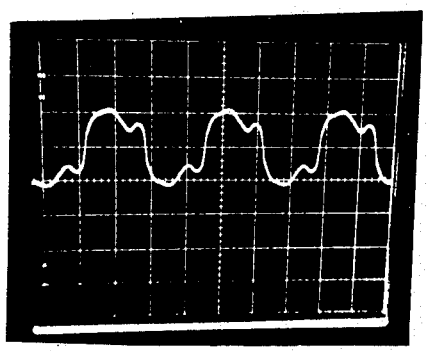

The operation of this circuit is conventional except for the fact that the capacitance of the nonlinear capacitor 7 varies with the amplitude of the applied voltage. Assuming a sinusoidal line voltage applied to terminals 3, 4, FIG. 2A illustrates the lamp current waveform for a typical prior art circuit which is identical to the circuit of FIG. 1 except that the prior art circuit uses a fixed value capacitor in place of the voltage-dependent capacitor 7 described herein. The current waveform of FIG. 2A clearly shows the objectionable waveform distortion which it is one object of the present invention to overcome. This type of current waveform may be detrimental to the life of the lamp. FIG. 2B shows the corresponding lamp current waveform for the novel circuit of FIG. 1 and clearly illustrates the improvement obtained by the substitution of the nonlinear capacitor 7 of the present invention for a conventional fixed value capacitor.

One advantage of a square-wave lamp current is that the deionization occurring in the lamp during the zero crossover of the current is relatively small. A further advantage of the device of the invention is that a relatively small inductor core may be used and still produce an acceptable current waveform in the lamp.

Figure 3:
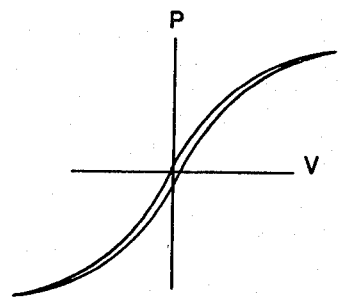
FIG. 3 shows the hysteresis loop of a capacitor dielectric material suitable for use in the nonlinear variable capacitor of the ballast circuit shown in FIG. 1.
Figure 4A:
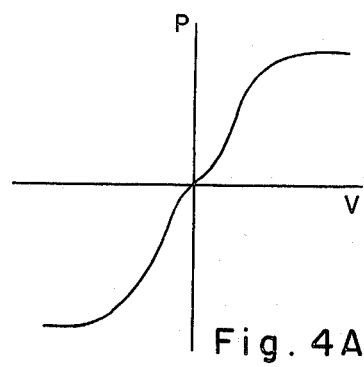
FIG. 4A is a characteristic curve of polarization (P) versus voltage (V) of a typical antiferroelectric to ferroelectric dielectric material suitable for use in the nonlinear capacitor of the ballast circuit of FIG. 1.
Figure 4B:
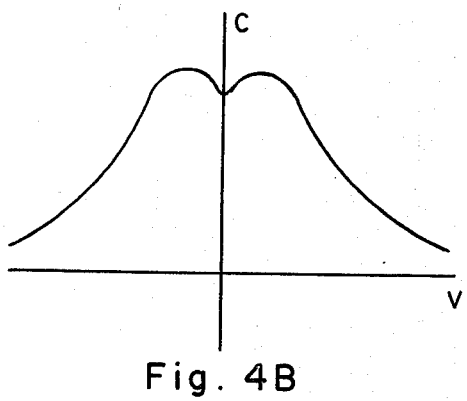
FIG. 4B shows the corresponding characteristic curve of capacitance (C) versus voltage (V) for the dielectric material illustrated in FIG. 4A, and FIGS. 5A and 5B illustrate characteristic curves of P versus V and C versus V of a typical antiferroelectric dielectric material proposed for use in the nonlinear capacitor.
Figure 5A:
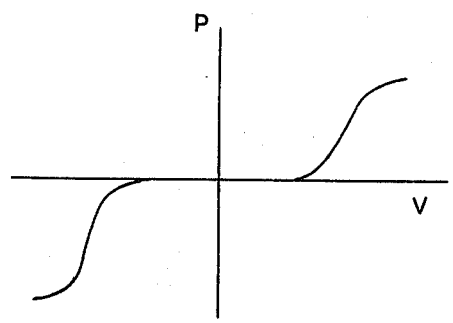
Figure 5B:
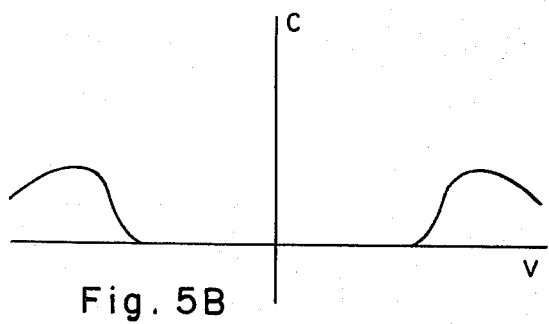

FIGS. 3 and 4A–4B illustrate typical characteristic curves of a nonlinear capacitor having a low hysteresis ferroelectric dielectric material that is suitable for use in capacitor 7 of the circuit of FIG. 1. These curves are typical of the class of piezoelectric ceramic materials known as slim-loop PLZT materials. FIG. 3 is a generalized plot of the polarization (P) versus voltage (V) curve of a suitable PLZT ferroelectric material, whereas FIG. 4A shows a similar idealized characteristic with the hysteresis effect neglected. FIG. 4B shows the variation in capacitance (C) with the voltage (V) of a capacitor formed therefrom. It is desirable to select a dielectric material that exhibits a narrow hysteresis loop (FIG. 3) in order to keep the power losses at a minimum. FIGS. 5A and 5B show typical curves of an anti-ferroelectric material that could be used in combination with other dielectric materials to tailor the nonlinear capacitor of the present invention to a given lamp-ballast circuit configuration of the present invention.

It is apparent from the foregoing description that the present invention represents an entirely new and different mode of operation for gas discharge lamp ballast circuits which yields significant advantages over prior art devices. In particular the invention provides a reduction in the size, weight and cost of a ballast device, while at the same time increasing the light output from the lamp due to the higher circuit efficiency.

It will also be apparent to persons skilled in the art that various modifications in the composition of the non-linear capacitor can be employed in order to achieve the advantages and the new and unexpected results of the invention as described in the foregoing specification. Therefore, the form of the invention set out above should be considered as being illustrative and not as limiting the scope of the appended claims.

I claim:

1. Apparatus for operating an electric discharge lamp with an alternating current comprising, a pair of input terminals for connection to a source of alternating current, inductive impedance means for limiting the flow of current, a nonlinear variable capacitive impedance device, and means connecting said inductive impedance means, said nonlinear capacitive impedance device and the discharge lamp in series circuit across said pair of input terminals whereby the impedance of the nonlinear capacitive impedance device varies with an electric parameter of the apparatus during each half cycle of the alternating current in a direction tending to produce a square-wave lamp current waveform.

2. Apparatus as claimed in claim 1 wherein the impedance of the capacitive impedance device is greater than the impedance of the inductive impedance means.

3. Apparatus as claimed in claim 1 wherein said nonlinear capacitive impedance device comprises a voltage dependent capacitor whose capacitance varies as a function of the applied voltage.

4. Apparatus as claimed in claim 3 wherein said inductive impedance means comprises an iron core high leakage transformer having a primary winding coupled to the input terminals and a secondary winding connected in series circuit with the nonlinear voltage-dependent capacitor and the discharge lamp across said input terminals.

5. Apparatus as claimed in claim 1 wherein said nonlinear capacitive impedance device comprises nonlinear capacitor means whose capacitance varies with an electric parameter of the apparatus.

6. Apparatus as claimed in claim 5 wherein said nonlinear capacitor means is comprised of a ferroelectric dielectric material.

7. Apparatus as claimed in claim 5 wherein the dielectric of the nonlinear capacitor means is composed of a PLZT material.

8. Apparatus as claimed in claim 5 wherein the dielectric of the nonlinear capacitor means is composed of a barium titanate material.

9. Apparatus as claimed in claim 5 wherein said nonlinear capacitor means is composed of an antiferroelectric material.

10. Apparatus as claimed in claim 5 wherein said nonlinear capacitor means comprises an antiferroelectric dielectric material in combination with a ferroelectric dielectric material.

11. Apparatus as claimed in claim 5 wherein the nonlinear capacitor means comprises a linear dielectric material in combination with a nonlinear dielectric material.

* * * * *

UNITED STATES PATENT AND TRADEMARK OFFICE
CERTIFICATE OF CORRECTION

PATENT NO. : 3,996,495
DATED : December 7, 1976
INVENTOR(S) : STEPHEN HERMAN

It is certified that error appears in the above-identified patent and that said Letters Patent are hereby corrected as shown below:

Column 2, line 13, "supply" should read --AC supply--

Claim 9, line 3, after "tric" should read --dielectric--.

Signed and Sealed this

Twenty-first Day of November 1978

[SEAL]

Attest:

RUTH C. MASON
Attesting Officer

DONALD W. BANNER
Commissioner of Patents and Trademarks